Sept. 2, 1969  T. WILHARM ET AL  3,464,334
PHOTOGRAPHIC CAMERA WITH BUILT-IN EXPOSURE METER
Original Filed Aug. 3, 1965  2 Sheets-Sheet 1
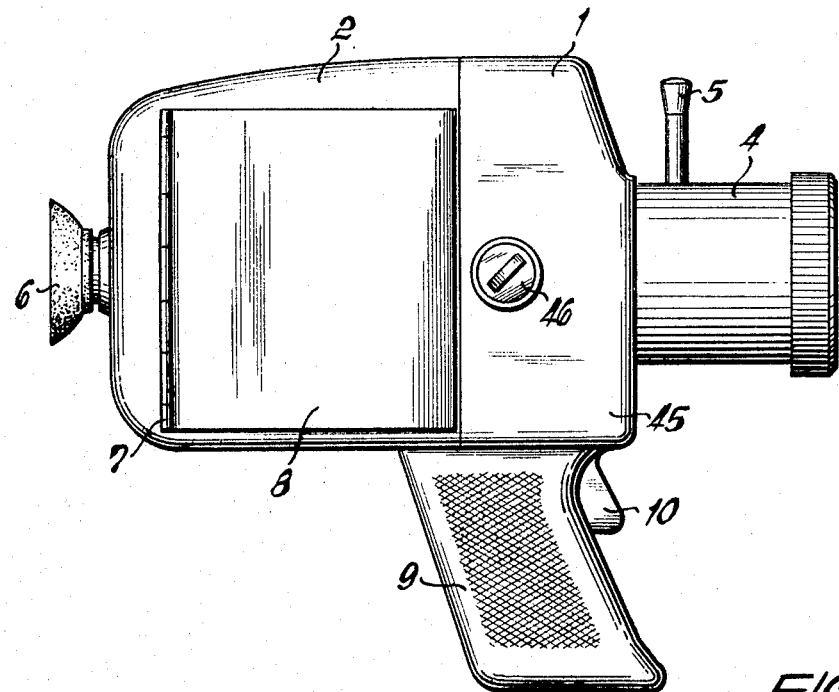
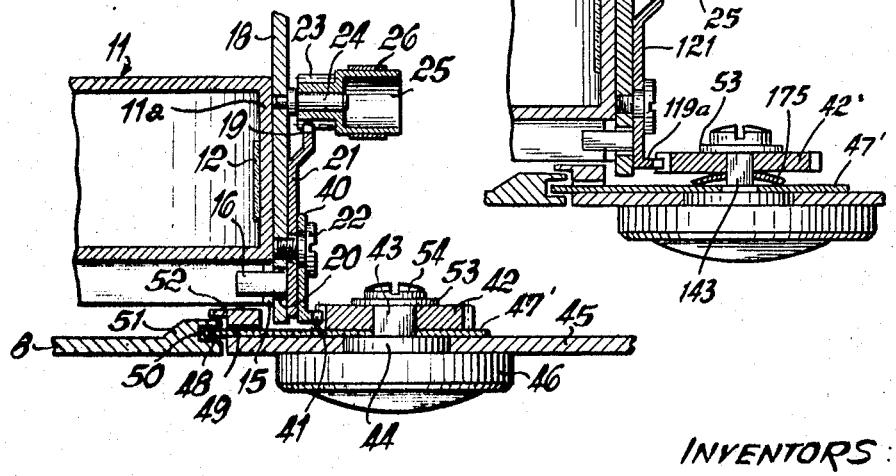
INVENTORS:
THEO WILHARM
ALBERT STIERINGER
BY
Michael J. Striker
their ATTORNEYS

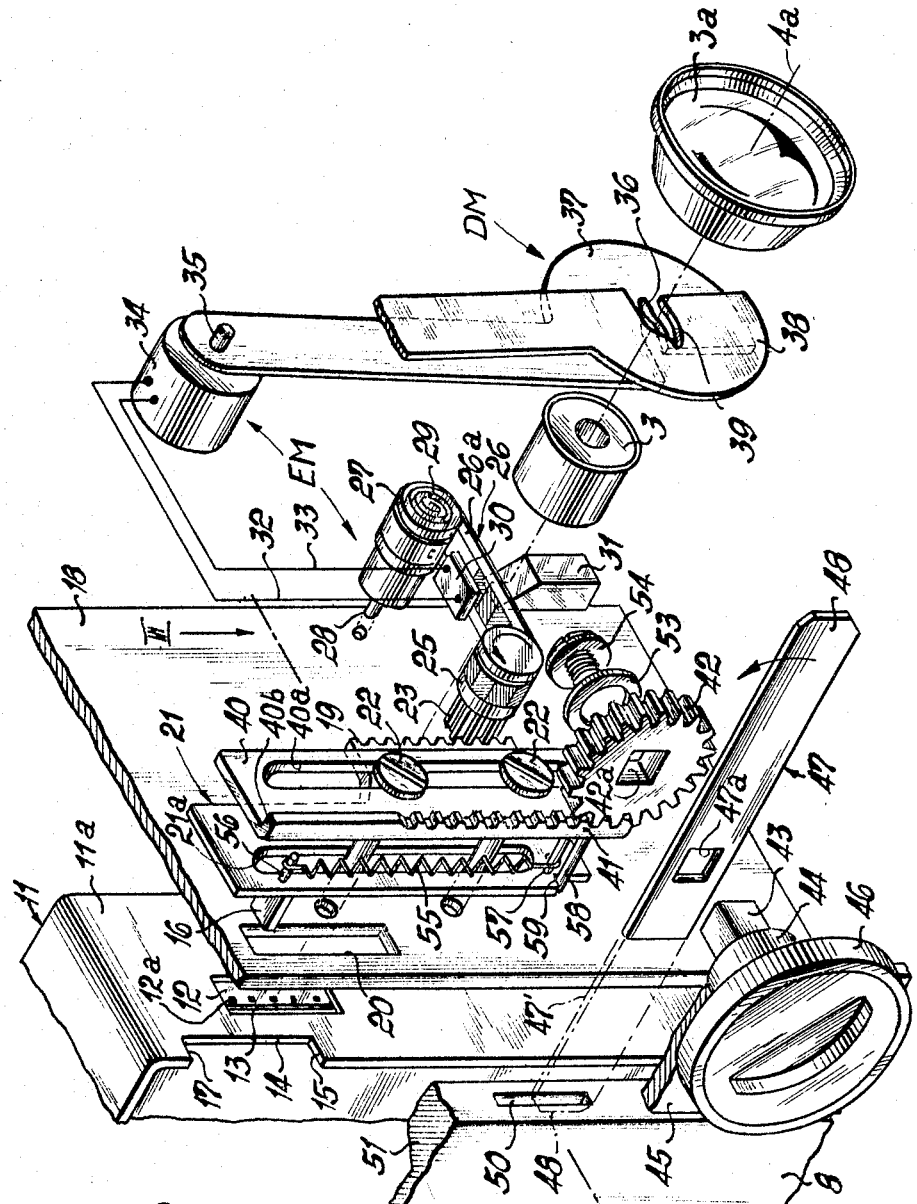

United States Patent Office 3,464,334
Patented Sept. 2, 1969

3,464,334
PHOTOGRAPHIC CAMERA WITH BUILT-IN
EXPOSURE METER
Theo Wilharm, Endersbach, and Albert Stieringer,
Calmbach, Germany, assignors to Eugen Bauer
GmbH, Stuttgart-Unterturkeim, Germany
Continuation of application Ser. No. 476,944, Aug. 3,
1965. This application Aug. 5, 1968, Ser. No. 754,123
Claims priority, application Germany, Aug. 5, 1964,
B 77,977
Int. Cl. G01j 1/00, 1/52; G03b 19/04
U.S. Cl. 95—10                                        13 Claims

ABSTRACT OF THE DISCLOSURE

A photographic camera wherein the door of the magazine chamber can be locked by a locking member which thereby effects movement of a sensing element into engagement with a marker provided on the magazine to indicate the sensitivity of film therein whereby the sensing element adjusts the exposure meter. The locking member can be moved between the locking position and an idle position, in which the sensing element is disengaged from the marker, and the locking member is free to dwell in each such position.

---

This is a continuation of application Ser. No. 476,944, filed Aug. 3, 1965, now abandoned.

The present invention relates to photographic cameras in general, and more particularly to an improved photographic camera with built-in exposure meter. Still more particularly, the invention relates to improvements in a still camera or movie camera of the type wherein the film-containing magazine or cassette automatically determines the initial setting of the exposure meter so that such setting is indicative of the light sensitivity of film which is stored in the magazine.

It is already known to provide a photographic camera with a built-in exposure meter whose initial setting is selected by an adjusting portion or marker on the film magazine whereby the position of the marker with reference to the remainder of the magazine reflects the light sensitivity of film which is contained in such magazine. Thus, the position of the marker on a magazine containing a supply of highly light-sensitive film is different from the position of the marker on a magazine which contains a film of still higher or relatively low light sensitivity. As a rule, the marker of a properly inserted magazine is mechanically scanned or tracked by a movable sensing element or scanner which is biased by a spring tending to move it away from a starting position and into engagement with the marker. The sensing element or scanner forms part of the exposure meter and is operatively connected with an adjustable component of the exposure meter to select the initial setting in dependency on the light sensitivity of film, i.e., in dependency on the position of the marker on that magazine which is actually accommodated in the film chamber of the camera.

It is also known to provide a camera of the just outlined type with a locking device serving to lock or unlock a closure or door which is movable with reference to the remainder of the camera housing to prevent or to afford access to the film chamber. When moved to and locked in closed position, the door prevents uncontrolled entry of light rays into the film chamber and also prevents removal of the magazine. In certain known cameras, the locking device for the door of the film chamber is coupled with the sensing element in such a way that the unlocking of the door automatically results in movement of the sensing element back to its starting position, namely, away from engagement with the marker of the film magazine. A serious drawback of such cameras is that the sensing element is permanently biased to scanning position and is capable of entraining the locking device for movement away from idle position (i.e., when the sensing element moves from starting to scanning position, the locking member invariably shares such movement until the sensing element engages a marker) which means that the locking device must be held by hand whenever the sensing element is to be disengaged from the magazine because, as soon as the locking device is released, the aforementioned spring immediately moves the sensing element away from its starting position whereby the sensing element interferes with the removal or insertion of magazines. Also, and since one hand of the user is tied down by holding the locking device, a magazine must be inserted or removed by the other hand alone which is inconvenient, particularly to a clumsy or inexperienced photographer. Furthermore, all heretofore known connections between the sensing element and the remainder of the exposure meter or the locking device are rather bulky, complicated and too expensive to be incorporated in popularly priced cameras.

Accordingly, it is an important object of our present invention to provide a photographic camera wherein the aforementioned drawbacks of conventional cameras are avoided in a very simple manner and which can be constructed and assembled at reasonable cost.

Another object of the invention is to provide a novel connection between the sensing element and the locking device in a camera wherein such sensing element forms part and serves to select the initial setting of a built-in exposure meter.

A further object of the invention is to provide a camera wherein the locking device for the door of the film chamber need not be held by hand when the user wishes to remove or to insert a magazine into the film chamber.

An additional object of the invention is to provide a camera wherein the sensing element automatically returns to starting position in response to opening of the door which leads to the interior of the film chamber, wherein such sensing element remains in starting position as long as the door remains open, wherein the sensing element remains in starting position as long as the door remains unlocked, and wherein the sensing element automatically selects the initial setting of the exposure meter as soon as the door is closed and locked subsequent to insertion of a magazine into the film chamber.

Briefly stated, one feature of our invention resides in the provision of a photographic camera for use with film magazines or cassettes of the type having adjusting portions or markers indicative of the light sensitivity of film therein. The camera comprises a film chamber which is arranged to accommodate a magazine and is provided with a door or closure movable between open and closed positions, a locking device including a bolt or an analogous locking member which is movable between idle and locking positions to respectively permit or prevent opening of the door, an adjustable exposure meter including a sensing element movable between a starting position and a plurality of additional or intermediate positions each of which is indicative of a different light sensitivity and in each of which the sensing element selects the initial setting of the exposure meter to account for the sensitivity of film in that magazine which is inserted into the film chamber, and a novel motion transmitting connection for moving the sensing element only during certain portions or stages of movement of the locking member to and from its locking position in such a way that the sensing element is automatically returned to starting position during movement of the locking member to idle position and that, in response to movement of the locking member from idle position to locking position, the sensing element shares such movement until it engages the marker of the magazine in the film chamber to thereby select the initial setting of the exposure meter.

The motion transmitting connection between the sensing element and the locking member may comprise a spring which, though arranged to entrain the sensing element from its starting position, does so only in response to movement of the locking member from idle to locking position, and a positive motion transmitting unit (such as a shoulder on the sensing element or on a part connected therewith and a pin which is shifted in response to movement of the locking member to idle position) which will entrain the sensing element back to starting position during the last stage of return movement of the locking member to idle position. Alternatively, the motion transmitting connection may comprise a friction clutch which allows the locking member to move with reference to the sensing element, at least when the sensing element already engages the marker but the locking member does not as yet reach its locking position. In each embodiment of our invention, the connection between the locking member and the sensing element does not include any means which would tend to bias the sensing element from its starting position when the locking member is moved to and remains in idle position, i.e., the sensing element can remain in starting position unless and until the locking member is actually rotated or otherwise moved, preferably by hand, so as to advance from idle position to locking position.

The novel features which are considered as characteristic of the invention are set forth in particular in the appended claims. The improved photographic camera itself, however, both as to its construction and its mode of operation, together with additional features and advantages thereof, will be best understood upon perusal of the following detailed description of certain specific embodiments with reference to the accompanying drawings, in which:

FIG. 1 is a side elevational view of a movie camera which is constructed and assembled in accordance with our invention;

FIG. 2 is a perspective exploded view of the improved connection between the sensing element and the locking device of the camera shown in FIG. 1;

FIG. 3 is a fragmentary transverse horizontal section substantially as seen in the direction of arrows from the line III—III of FIG. 2; and FIG. 4 is a section through a modified connection between the locking device and the sensing element.

Referring first to FIGS. 1 and 2, there is shown a movie camera which comprises a front part including a housing 1 and a rear part including a film chamber 2. The housing 1 carries a zoom lens 4 including a main lens component 3 and a reciprocable auxiliary lens component 3a which latter is adjustable by means of a lever 5. The rear wall of the film chamber 2 carries the eyepiece 6 of a viewfinder. This film chamber 2 is further provided with a closure or door 8 which is pivotable about the axis of a vertical hinge 7. A locking device including a turnable knob 46 serves to lock or unlock the door 8 so as to respectively prevent or afford access to the interior of the film chamber 2. The lower wall of the housing 1 supports a pistol grip handle 9 and a depressible release trigger 10.

The film chamber 2 is arranged to accommodate a film cassette or magazine 11 of 8 mm. film 12. This film 12 is formed with a single row of perforations 12a and a portion thereof is guided behind an aperture or window 13 which is provided in the front panel 11a of the magazine 11. The customary motor-driven claw pull-down (not shown in the drawings) will advance the film 12 in stepwise fashion when the operator depresses the trigger 10. The front panel 11a is further provided with an adjusting portion or marker which is utilized to automatically determine the initial setting of a built-in adjustable exposure meter EM so as to take into consideration the light sensitivity of the film 12. In the illustrated embodiment, the marker comprises a stop face 15 disposed at the lower end of a rectangular cutout or recess 14 in the left-hand vertical edge portion of the front panel 11a. The upper end of the cutout 14 is bounded by a second stop face 17. The distance between the stop faces 15 and 17 is indicative of the sensitivity of the film 12, i.e., another magazine 11 which contains a different type of film will be provided with a cutout 14 whose length (as seen in the direction from the stop face 17 toward the stop face 15) is different from the length of the cutout 14 shown in FIG. 2. The stop face 15 is tracked by a sensing element or scanner 16 which forms part of the exposure meter EM, and the latter is operatively connected with a diaphragm mechanism DM so that the size of the diaphragm opening will be a function of the light sensitivity of film 12 and also of the intensity of light coming from a viewed scene or subject. The upper stop face 17 determines the initial or starting position of the sensing element 16 such as will correspond to a maximum film sensitivity, and the lower stop face or marker 15 will arrest the sensing element 16 in such additional or intermediate position which reflects the light sensitivity of film 12 in the magazine 11. If a magazine contains film of relatively low light sensitivity, the cutout 14 in the front panel 11a is relatively long. The spatial position of the upper stop face 17 is the same on all types of magazines 11 regardless of the light sensitivity of film therein so that it is the lower stop face or marker 15 (and more particularly its distance from the upper stop face 17) which reflects the light sensitivity of film 12.

The housing 1 comprises a transversely extending platelike vertical rear wall 18 which is located in front of the panel 11a and is provided with an aperture or window (not shown) registering with the aperture or window 13 of the front panel 11a. This aperture serves to admit light rays which enter through the zoom lens 4 in the direction indicated by the phantom line 4a representing the optical axis. The rear wall 18 is further provided with a cutout or slot 20 which is located directly in front of the cutout 14 and whose length at least equals the distance between the stop faces 15 and 17 to make sure that the sensing element 16 may move from abutment with the upper stop face 17 (starting position) into actual abutment with the lower stop face 15. Actually, the length of the slot 20 at least equals the length of the cutout 14 in a magazine 11 which contains a supply of film of lowest light sensitivity. This insures that the sensing element 16 will be free to assume an optimum position regardless of the type of magazine in the film chamber 2.

The sensing element 16 is shown in the form of a bent-over projection or lug forming part of a vertically reciprocable toothed carrier or rack 21 having a vertically extending guide slot 21a for a pair of vertically spaced guide bolts 22 which are screwed into and extend forwardly from the rear wall 18 of the housing 1. The rack 21 is formed with a row of teeth 19 which mesh with a pinion 23 rotatable on a stub shaft 24 carried by the rear wall 18, see particularly FIG. 3. The pinion 23 is rigid with a reel or drum 25 which is connected with one end of a translucent band 26, the other end of this band being connected with a second reel or drum 27 which is rotatable on a shaft 28 secured to the rear wall 18. A torsion spring 29 is connected to the drum 27 and shaft 28, and its function is to convolute the band 26 onto the drum 27 to the extent permitted by the pinion 23 and rack 21. In other words, the spring 29 tends to rotate the drum 27 in a counterclockwise direction, as viewed in FIG. 2, so as to make sure that the portion 26a of band 26 between the drums 25 and 27 remains taut and is located in a substantially horizontal plane.

The band portion 26a is located in the pathway of light rays impinging against the photosensitive surface of a photoelectric cell 30 which is connected in circuit with a galvanometer 34 of the exposure meter EM. The light rays passing through the band portion 26a are deflected by a prism 31 whose inclined deflecting surface intersects the optical axis 4a. The remainder of light passing along the optical axis 4a will enter through the aligned windows of the rear wall 18 and panel 11a to reach that frame of the film 12 which is momentarily located behind the window 13. The connection between the cell 30 and the galvanometer 34 comprises two conductors 32 and 33. The rotor 35 of the galvanometer 34 is connected to one blade 37 of the diaphragm mechanism DM. The blade 37 has a cutout 36 which, together with the cutout 39 of a second blade 38, determines the exact size of the diaphragm opening. The blades 37, 38 are coupled to each other in such a way that the degree to which they overlap is a function of the intensity of light reaching the cell 30. Referring to FIG. 2, the blade 38 will be moved in a clockwise direction if the rotor 35 rocks the blade 37 in a counterclockwise direction to thereby increase the size of the diaphragm opening, and vice versa.

The band 26 is subdivided into sections or zones each of which offers a different resistance to the passage of light rays. Each such section or zone corresponds to a different light sensitivity of film, and the arrangement which causes the band 26 to move from the drum 25 toward the drum 27 or vice versa is such that the zone of maximum translucency is located between the prism 31 and cell 30 at the time when the chamber 2 accommodates a film 12 of maximum light sensitivity. The zone of minimum translucency will be located in the path of light rays impinging against the cell 30 when the film 12 is one of minimum light sensitivity. Thus, the cell 30 receives more light when the sensitivity of film in the magazine 11 is relatively high whereby the cell sends through the conductors 32, 33 an impulse which causes the rotor 35 to turn in a clockwise direction, as viewed in FIG. 2, with the result that the size of the diaphragm opening (constituted by the non-overlapped portions of the cutouts 36, 39) decreases and the camera admits less light to the window 13 and film 12. If the band 26 is caused to move an opaque zone between the prism 31 and cell 30, the latter receives less light and the rotor 35 causes a smaller clockwise angular displacement of the blade 37 with the result that the diaphragm mechanism DM will define an opening of larger size so that more light will reach the film frame behind the window 13. It will be seen that the exposure meter EM adjusts the diaphragm mechanism DM in a fully automatic way and that the size of the diphragm opening is a function of the intensity of light coming from the viewed scene or subject.

Of course, it is clear that the heretofore described operative connection between the sensing element 16 and the remainder of the exposure meter EM may be replaced by other types of connections without in any way departing from the spirit of our invention. For example, the sensing element 16 may select the resistance of a variable resistor which is connected in the electric circuit of the exposure meter and whose resistance is varied in a sense to account for various light sensitivities. It is equally possible to provide a mechanical connection between the sensing element 16 and the casing of the galvanometer 34 so that the initial angular position of the casing will reflect the light sensitivity of film in that magazine 11 which is located in the film chamber 2. Also, the cell 30 may be replaced by a photosensitive resistor which is connected in series with a battery or another suitable source of electrical energy. All that counts is to provide an operative connection between the sensing element 16 and an adjustable part of the exposure meter EM so as to select the initial setting of the exposure meter by full consideration of the light sensitivity of film in the magazine 11.

The rack 21 cooperates with a second rack 40 which forms part of the motion transmitting means between the sensing element 16 and the locking device. The rack 40 is located in front of the rack 21 and is also provided with a vertical guide slot 40a for the bolts 22. Thus, the front rack 40 is reciprocable up and down in the same way as the rear rack 21. The teeth 41 of the front rack 40 are provided on a forwardly bent vertical edge portion 40b and mesh with a second pinion 42 which is non-rotatably secured to the polygonal tip 43 of a shaft 44 for the knob 46. As shown in FIG. 2, the bore 42a of the pinion 42 is of square cross-sectional outline to make sure that the pinion 42 must share all angular movements of the knob 46. The tip 43 of the shaft 44 also extends through a square aperture 47a in a locking member 47 here shown as an elongated bolt having an end portion 48 which is remote from the shaft 44. This shaft is journalled in the side wall 45 of the housing 1 and the knob 46 is located at the outer side of the wall 45 to be readily accessible. The means for detachably securing the bolt 47 and pinion 42 to the shaft 44 comprises a washer 53 and a screw 54, see FIGS. 2 and 3.

The locking bolt 47 is turnable back and forth through 180 degrees between the solid line idle position and the phantom-line locking position 47' of FIG. 2. In the locking position 47', the end portion 48 of the bolt 47 extends through a slot 49 of the side wall 45 and into a recess 50 provided in a relatively thick front edge portion 51 of the door 8. When the door 8 is moved to closed position as shown in FIG. 3, the edge portion 51 abuts against a stop ledge 52 of the side wall 45 and the recess 50 is aligned with the cutout 49 to make sure that it can receive the end portion 48 when the bolt 47 is moved to the locking position 47'. The magazine 11 can be inserted or removed only when the operator turns the knob 46 in a sense to move the locking bolt 47 to the solid-line position of FIG. 2. It will be seen that the locking device comprises the parts 43, 44, 46, 47, 53, 54 and that part of the edge portion 51 which surrounds the recess 50.

The racks 21 and 40 are coupled to each other by a resilient element here shown as a helical spring 55 the upper end of which is attached to a stud 56 secured to the upper portion of the rear rack 21. The lower end of the spring 55 is attached to a similar stud 57 mounted on the lower end portion of the front rack 40. The spring 55 tends to maintain a shoulder 59 of the rear rack 21 in abutment with a pin 58 provided on the front rack 40. Consequently, and when the magazine 11 is properly inserted into the film chamber 2 and the knob 46 is turned in a counterclockwise direction, as viewed in FIG. 2, to move the bolt 47 to the locking position 47', the pinion 42 moves the front rack 40 downwardly and the spring 55 compels the rear rack 21 to share such downward movement until the sensing element 16 reaches the lower stop face or marker 15. The spring 55 serves as a means for automatically moving the sensing element 16 into abutment with the lower stop face 15 even before the door 8 is fully locked by the bolt 47. When the knob 46 is rotated in a clockwise direction to return the bolt 47 to the solid-line position of FIG. 2, the pin 58 automatically lifts the rear rack 21 to such an extent that the sensing element 16 returns into abutment with the stop face 17 to reassume its starting position. Such starting position of the sensing element 16 corresponds to a maximum light sensitivity. The spring 55 is prestressed and stores additional energy when the sensing element 16 already abuts against the lower stop face 15 but the front rack 40 continues to move downwardly in response to counterclockwise rotation of the knob 46 and pinion 42. Thus, the bolt 47 can complete the last stage of its movement to locking position at the time the sensing element 16 already assumes such additional or intermediate position which is determined by the distance between the stop faces 15 and 17.

The operation of our improved camera is as follows:

When the door 8 is open, the user inserts a fresh film magazine 11 and, on closing of the door, turns the knob 46 in a counterclockwise direction, as viewed in FIG. 2, so that the bolt 47 assumes the locking position 47' of FIG. 3 and its end portion 48 enters the recess 50 in the edge portion 51 of the door 8. The polygonal tip 43 of the shaft 44 rotates the pinion 42 in a counterclockwise direction and causes the front rack 40 to move downwardly, as viewed in FIG. 2, and to entrain the rear rack 21 through the intermediary of the spring 55. The downward movement of the rear rack 21 is terminated when the sensing element 16 comes into actual abutment with the lower stop face 15. During its movement under the bias of the spring 55, the rack 21 rotates the pinion 23 in a counterclockwise direction, as viewed in FIG. 2, whereby the drum 25 rotates with the pinion 23 and pays out a certain length of the band 26. The band 26 is immediately collected by the drum 27 which is biased by the torsion spring 29 so that the band portion 26a remains taut and places into the path of light rays coming from the prism 31 that zone thereof whose light transmissivity corresponds to the light sensitivity of film 12 in the magazine 11, i.e., the transmissivity of the zone then located between the prism 31 and cell 30 reflects the distance between the stops 15 and 17 in the front panel 11a of the magazine 11. The impulse sent by the cell 30 through the conductors 32, 33 causes the rotor 35 to assume an initial position which corresponds to the light sensitivity of film 12 so that the exposures which are made in response to depression of the trigger 10 will be accurately exposed because the initial setting of the exposure meter was determined by the sensing element 16 in dependency on the distance between the stop faces 15 and 17 of that magazine 11 which is actually accommodated in the film chamber 2.

Once the sensing element 16 reaches the lower stop face 15, the rear rack 21 comes to a halt and cannot share further downward movement of the front rack 40. The extent of downward movement of the front rack 40 (in response to rotation of the knob 46 through an angle of 180 degrees) is such that the sensing element 16 invariably comes into actual abutment with the lower stop faces 15 of all types of magazines, i.e., of magazines which contain film of very low or very high light sensitivity. In other words, when the knob 46 has moved the end portion 48 of the bolt 47 into the recess 50 of the door 8 to lock the latter, the sensing element 16 invariably engages the lower stop face 15 regardless of the light sensitivity, and the arrangement is preferably such that downward movement of the front rack 40 suffices to move the pin 58 away from the shoulder 59 when the sensing element 16 abuts against the stop face 15 and the bolt 47 locks the door 8 in closed position.

In order to remove the magazine 11, the user turns the knob 46 in a clockwise direction, as viewed in FIG. 2, whereby the bolt 47 moves from the solid-line position 47' of FIG. 3 into the solid-line position of FIG. 2 and permits opening of the door 8. During such clockwise rotation of the knob 46, the pinion 42 causes the front rack 40 to move upwardly relative to the rear rack 21 until the pin 58 reaches and entrains the shoulder 59. During such relative movement of the front rack 40, the upwardly moving stud 56 allows the spring 55 to contract slightly (but not entirely). The two racks will travel as a unit as soon as the pin 58 engages the shoulder 59, i.e., the unit including the pin 58 and shoulder 59 is of the positive motion transmitting type. When the rack 21 begins to move upwardly, its teeth 19 cause the pinion 23 to rotate in a clockwise direction, as viewed in FIG. 2, whereby the drum 25 winds the band 26 against the bias of the spring 29. In other words, the drum 27 then pays out a certain length of the band 26 and such length is taken up by the drum 25 which rotates with the pinion 23. When the sensing element 16 comes into abutment with the upper stop face 17, the band portion 26a places a zone of maximum light transmissivity into the space between the prism 31 and cell 30 because the starting position of the sensing element 16 corresponds to maximum light sensitivity.

A very important novel feature of the camera shown in FIGS. 1 to 3 is that the locking bolt 47 is movable with reference to the sensing element 16 at the time it moves to locking position 47' and also when it moves back to idle position. Thus, the connection between the parts 16 and 47 is such that the knob 46 need not be held by hand in order to maintain the sensing element 16 in starting position. Furthermore, the sensing element 16 returns to starting position in automatic response to movement of the locking bolt to idle position and the latter may be released during insertion or removal of a cartridge from the film chamber 2. In other words, the movement of the sensing element 16 to starting or operative position is incidental to movement of the locking bolt to idle or operative position, and each movement of the sensing element is invariably completed at the time the locking bolt assumes the corresponding position. Also, the sensing element cannot cause any movements of the locking bolt, i.e., the latter can be called a prime mover because any movements which the sensing element can perform will take place in response to certain stages of movement of the bolt 47 toward and away from idle position.

The camera of FIGS. 1 to 3 may be simplified to a considerable degree if the motion transmitting connection 40–42, 55, 58, 59 between the locking bolt 47 and the carrier 21 of the sensing element 16 is replaced by or comprises a friction clutch. For example, the front rack 40 may be omitted in its entirety if the pinion 42 is replaced by a friction wheel or by a friction disk which engages directly with the rack 21, or if the connection between the pinion 42 and the shaft 44 comprises a suitable friction clutch which normally compels the pinion 42 to rotate with the knob 46 but allows the pinion to remain stationary when the sensing element 16 engages the stop face 15 or 17. In this latter embodiment which is shown in FIG. 4, the pinion 42 meshes directly with a second set of teeth 119a provided on a modified rack 121 so that the rack 40, the spring 55, the studs 56, 57, the shoulder 59 and the pin 58 may be omitted in their entirety. The friction clutch comprises an elastic washer 175 which biases the pinion 42 against the washer 53, and the pinion 42 is rotatable on the shaft 143. Such construction is characterized by utmost simplicity and great reliability.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In a photographic camera for use with film magazines of the type having markers indicative of the light sensitivity of film therein, a film chamber arranged to accommodate a magazine and having a door movable between open and closed positions; a locking device including a locking member movable between idle and locking positions to respectively permit or prevent opening of said door, said locking member being free to dwell unrestrained in each of said positions thereof; and adjustable exposure meter including a sensing element movable between a starting position and a plurality of additional positions each of which is indicative of a different light sensitivity and in each of which said sensing element selects the initial setting of the exposure meter to account for light sensitivity of film in that magazine which is inserted into said chamber; and motion transmitting means for moving said sensing element from starting position in response to the first stage of movement of said locking member from idle position until said sensing element abuts against the marker of a magazine in said chamber to assume such additional position which indicates the light sensitivity of film in the magazine and for moving said sensing element back to starting position solely in response to movement of said locking member to idle position.

2. A structure as defined in claim 1, wherein said motion transmitting means is arranged to move said sensing element from starting position only in response to the first stage of movement of said locking member from idle position.

3. A structure as defined in claim 1, wherein said motion transmitting means comprises a resilient element arranged to entrain said sensing element from starting position and into abutment with the marker on movement of said locking member from idle position, and a positive motion transmitting unit for returning said sensing element to starting position in response to movement of the locking member back to idle position.

4. A structure as defined in claim 1, wherein said motion transmitting means comprises a friction clutch.

5. A structure as defined in claim 1, wherein said locking member is rotatable between said idle and locking positions and wherein said sensing element is reciprocable between said starting position and said additional positions.

6. A structure as defined in claim 1, wherein said locking device further includes a manually operated member for moving said locking member between idle and locking positions and wherein said motion transmitting means is arranged to move said sensing element from starting position solely in response to the first stage of manually induced movement of said locking member from idle position.

7. A structure as defind in claim 1, further comprising a housing connected with said film chamber, said locking device being mounted in said housing and said exposure meter being built into said housing and said sensing element extending into said chamber, said motion transmitting means including at least one motion transmitting part for moving said sensing element and the latter being arrested by the marker of the magazine in said film chamber in response to said first stage of movement of the locking member from idle position.

8. A structure as defined in claim 7, wherein said chamber is located behind said housing and wherein said locking device is operated manually.

9. In a photographic camera for use with film magazines of the type having markers indicative of the light sensitivity of film therein, a film chamber arranged to accommodate a magazine and having a door movable between open and closed positions; a locking device including a locking member movable between idle and locking positions to respectively permit or prevent opening of said door; an adjustable exposure meter including a sensing element movable between a starting position and a plurality of additional positions each of which is indicative of a different light sensitivity and in each of which said sensing element selects the initial setting of the exposure meter to account for light sensitivity of film in that magazine which is inserted into said chamber; and motion transmitting means for moving said sensing element from starting position in response to the first stage of movement of said locking member from idle position until said sensing element abuts against the marker of a magazine in said chamber to assume such additional position which indicates the light sensitivity of film in the magazine, and for moving said sensing element back to starting position in response to the last stage of movement of said locking member to idle position, said motion transmitting means comprising a carrier rigid with said sensing element, a reciprocable rack having a toothed portion, a pinion operatively connected with said locking member to rotate in opposite directions in response to movement of said locking member to and from idle position, said pinion meshing with the toothed portion of said rack, a resilient element connecting said carrier with said rack to move the sensing element from starting position and into abutment with the marker in response to rotation of of said pinion in one direction, and a positive motion transmitting unit having parts provided on said carrier and said rack for returning said sensing element to starting position in response to rotation of said pinion in another direction.

10. A structure as defined in claim 9, wherein said unit includes a pin fixed to said rack and a shoulder provided on said carrier and located in the path of said pin during movement of said locking member from said locking position toward said idle position.

11. A structure as defined in claim 9, werein said carrier comprises a toothed portion and said exposure meter further comprises a second pinion meshing with and rotatable by the toothed portion of said carrier, said second pinion being arranged to transmit movement of said sensing element toward abutment with a marker to an adjustable part of said exposure meter to thereby select the initial setting thereof.

12. In a photographic camera for use with film magazines of the type having markers indicative of the light sensitivity of film therein, a film chamber arranged to accommodate a magazine and having a door movable between open and closed positions; a locking member movable between idle and locking positions to respectively permit and prevent opening of said door, said locking member being free to dwell at least in said idle position thereof; an adjustable exposure meter including a sensing element movable between a starting position and a plurality of additional positions each of which is indicative of a different light sensitivity and in each of which said sensing element selects the initial setting of the exposure meter to account for light sensitivity of film in that magazine which is inserted into said chamber; and motion transmitting means for moving said sensing element from starting position in response to the first stage of movement of said locking member from idle position until said sensing element abuts against the marker of a magazine in said chamber to assume such additional position which indicates the light sensitivity of film in the magazine and for moving said sensing element back to starting position in response to movement of said locking member to idle position, said motion transmitting means having a limited transmission power.

13. A structure as defined in claim 12, wherein said motion transmitting means comprises an overload clutch.

References Cited

UNITED STATES PATENTS

| | | |
|---|---|---|
| 1,068,889 | 7/1913 | Goddard. |
| 3,159,357 | 12/1964 | Berlings. |
| 3,260,182 | 6/1966 | Nerwin. |
| 3,266,398 | 8/1966 | Kremp et al. |

NORTON ANSHER, Primary Examiner

JOSEPH F. PETERS, Jr., Asisstant Examiner

U.S. Cl. X.R.

95—31; 352—72